May 30, 1939.  E. A. ROSIN  2,160,033

MEANS FOR MOUNTING GLASS SHEETS UPON WORK TABLES

Filed April 29, 1938

Inventor
EDWIN A. ROSIN.

By Frank Fraser
Attorney

Patented May 30, 1939

2,160,033

UNITED STATES PATENT OFFICE 2,160,033

MEANS FOR MOUNTING GLASS SHEETS UPON WORK TABLES

Edwin A. Rosin, Toledo, Ohio, assignor to Libbey-Owens-Ford Glass Company, Toledo, Ohio, a corporation of Ohio Application April 29, 1938, Serial No. 205,043

10 Claims. (Cl. 51—277)

The present invention relates broadly to the grinding and polishing of glass sheets or plates by the so-called continuous system and more particularly to improved means for mounting the said sheets upon the work cars or tables used in such system.

In the continuous system for surfacing sheet glass, a plurality of glass sheets are mounted upon a series of cars or tables which are arranged end to end and movable continuously in a definite, substantially horizontal path to carry the glass sheets successively beneath and in engagement with a series of grinding and polishing units. In this system, it is customary to secure the glass sheets upon the tops of the cars or tables by embedding them in a relatively thin layer of plaster of Paris or some other suitable cement. The quality of the resultant finish on the glass and the amount of breakage during the grinding and polishing operations is largely dependent upon the proper securing of the glass sheets to the said cars or tables.

The primary object of this invention is the provision of improved means for bedding the glass sheets within the plaster of Paris or other cement used in such a manner as to facilitate the succeeding surfacing of the glass and to reduce breakage thereof from improper securing of the said sheets to a minimum.

Another important object of the invention is the provision of improved apparatus for bedding the glass sheets, embodying means for accurately positioning the sheets with respect to one another and for simultaneously pressing them downwardly into the plaster in an even, uniform manner so that the upper surfaces of successive sheets will be disposed in a common plane.

Another important object of the invention is the provision of apparatus of the above character for bedding the glass sheets embodying a plurality of pressing units mounted in a fixed position above the path of travel of the tables and adapted to press the glass sheets downwardly into the plaster evenly and uniformly as the said sheets are carried therebeneath.

Other objects and advantages of the invention will become more apparent during the course of the following description, when taken in connection with the accompanying drawing.

In the drawing, wherein like numerals are employed to designate like parts throughout the same:

Figure 1:
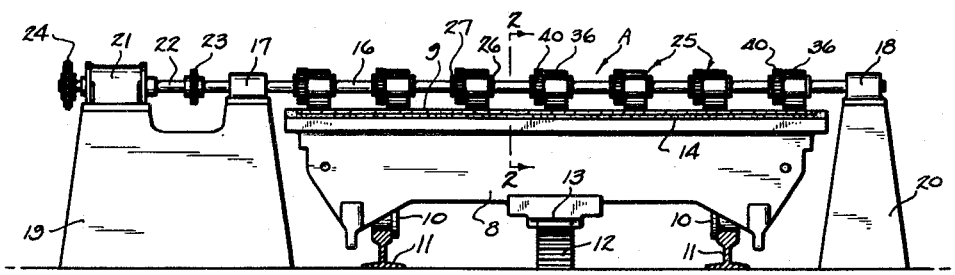
Fig. 1 is an end view of one of the work tables in the continuous system above which is mounted the glass bedding apparatus constructed in accordance with this invention.

As previously pointed out, the present invention is primarily designed for use in the continuous system for surfacing sheet glass wherein a plurality of cars or tables 8 are adapted to be arranged in end to end abutting relation to form a continuous train and to carry a series of glass sheets 9 mounted thereupon progressively beneath and in engagement with a series of grinding and polishing units. The tables 8 are here provided with wheels 10 rolling upon tracks 11, and any suitable type of drive mechanism may be employed for effecting the desired movement of the tables along said tracks such as, for example, a drive pinion 12 meshing with rack bars 13 carried upon the undersides of said tables.

The glass sheets 9 are preferably secured to the tops of the tables 8 by embedding them in a relatively thin layer of plaster of Paris or the like 14, and succeeding sheets may be spaced slightly from one another by means of a wooden strip or other suitable spacer 15 extending transversely of the tables. In practice, it is customary to mix the plaster of Paris or other cement with water and then pour it upon the tables, with the plaster being spread substantially uniformly over the tops thereof. The glass sheets are then laid upon the layer of wet plaster and pressed downwardly therein so that when the plaster sets, the sheets will be firmly attached to the tables.

The present invention concerns particularly the provision of novel and improved means for applying the desired pressure upon the upper surfaces of the glass sheets as they are carried forwardly for pressing the said sheets downwardly into the wet plaster and for also accurately positioning each sheet with respect to the preceding sheet to the end that upon hardening of the plaster, the sheets will be rigidly and uniformly supported throughout and maintained in the desired position against accidental displacement during the grinding and polishing operations whereby the danger of breakage or the liability of the sheets cracking or becoming displaced will be avoided.

In carrying out the invention, there is positioned above the path of travel of the tables 8 and at a suitable location between the point at which the glass sheets are laid upon the wet plaster and the first grinding unit, the improved glass bedding apparatus designated in its entirety by the letter A (Fig. 1). This apparatus comprises a horizontal shaft 16 extending transversely of the tables 8 and journaled at opposite ends in bearings 17 and 18 mounted upon standards 19 and 20 respectively disposed at opposite sides of the tables. Also carried by the standard 19 is a speed reducer 21 including a horizontal shaft 22 disposed in alignment with the shaft 16 and connected therewith by an adjustable friction clutch 23 of any desired construction. The shaft 22 is adapted to be driven from a chain and sprocket drive or the like 24 and the rotation of shaft 22 will be transmitted to shaft 16 through the friction clutch 23.

Carried upon the shaft 16 at spaced points transversely of the tables are a plurality of independent pressing units 25. Each pressing unit comprises a pair of vertical supporting plates 26 and 27 which are maintained in properly spaced relation by sleeves 28 and 29 positioned therebetween and through which pass tie bolts 30 and 31 respectively, said bolts also passing through openings in the supporting plates 26 and 27 and having threaded upon the opposite ends thereof nuts 32 and 33 respectively whereby the said supporting plates 26 and 27 are rigidly secured together in properly spaced relation. Each of the supporting plates 26 and 27 is provided at its inner end with a downwardly opening slot 34 so that the said plates can be readily slipped over the shaft 16 to position the pressing unit thereon.

Rotatably mounted upon the sleeve 28, between the supporting plates 26 and 27, is a pressing roller 35 preferably provided with a rubber tire 36 so as not to mar or scratch the surfaces of the glass sheets. Preferably formed integral with the roller 35 is a gear 37 which meshes with a gear 38 freely mounted upon the reduced end portion 39 of sleeve 29. Mounted upon the shaft 16, between the supporting plates 26 and 27, is a gear 40 fixed to the said shaft by suitable set screws or the like 41 and meshing with the gear 38.

Figure 2:
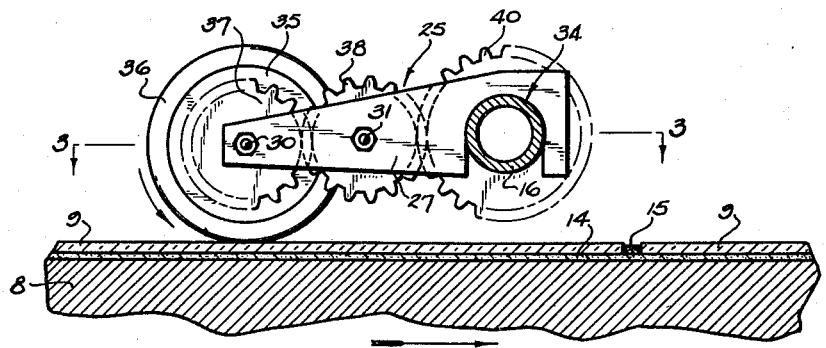
Fig. 2 is a vertical sectional view taken substantially on line 2—2 of Fig. 1, showing one of the pressing units in side elevation.
Figure 3:
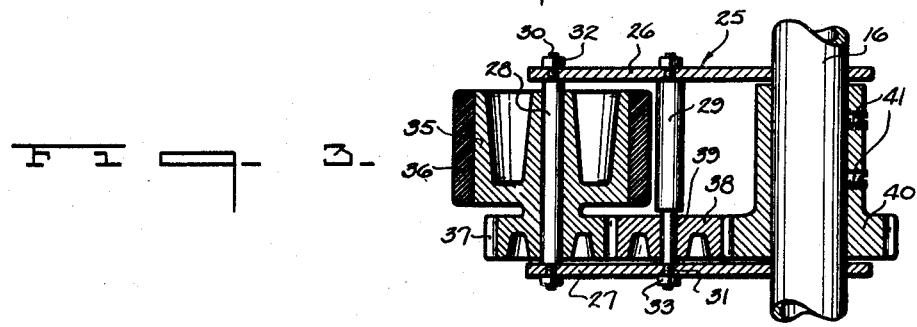
Fig. 3 is a horizontal section through the pressing unit taken substantially on line 3—3 of Fig. 2.

From the above, it will be readily apparent that upon rotation of shaft 16, the pressing rollers 35 of the pressing units will be positively driven through the intermeshing gears 40, 38 and 37. In operation, it is preferred that the rollers 35 rotate in the same direction as the travel of the tables 8, as indicated by the arrows in Fig. 2, and that the normal speed of rotation of the rollers be slightly greater than the linear speed of the tables. The friction clutch 23 is so adjusted, however, that after the glass sheets have been properly positioned upon the tables the said clutch will be caused to slip so that the rotary speed of the rollers will be automatically reduced to correspond to the linear speed of the tables.

More specifically, the plaster 14 is first spread upon the tops of the tables 8 and while the plaster is still wet, the glass sheet 9 is laid thereon in such a position that the forward edge thereof is located closely adjacent the spacer strip 15 which has been previously arranged at the rear edge of the preceding sheet. As the tables move forwardly to carry the glass sheet beneath the pressing units 25, the pressing rollers 35 thereof, turning at a relatively faster speed than the movement of the tables, will serve to push the sheet forwardly upon the layer of wet plaster until its forward edge firmly abuts the spacer strip 15. As soon as the sheet engages the spacer strip and further forward movement thereof prevented, the friction between the pressing rollers 35 and glass sheet will be sufficient to cause slipping of the clutch 23 so that the speed of rotation of the rollers will be automatically reduced to the speed of travel of the tables. Continued rotation of the pressing rollers at this speed will serve not only to hold the glass sheet firmly against the spacer strip but, in addition, the said rollers will function to press the glass sheet evenly and uniformly downwardly into the plaster as the said sheet is carried therebeneath. As the same amount of pressure will be applied by the rollers to each sheet of glass, all of the sheets will be arranged in the same horizontal plane relative to one another. The bedding of the glass sheets is automatically effected as the said sheets are carried forwardly, with the apparatus herein provided serving not only to properly bed the sheets in the plaster, but also accurately position each sheet with respect to the preceding sheet.

It will of course be appreciated that the invention is not limited to any particular type of spacer 15, and in fact this spacer may be eliminated and the adjacent edges of the glass sheets may be moved into abutting relation or separated from one another simply by a thin strip of plaster. Also, any suitable type of drive may be provided for the shaft 16 and if preferred, a separate adjustable friction clutch can be associated with each pressing roller 35 instead of using the single friction clutch 23 for all of the pressing rollers. With the arrangement shown and described, the pressing units 25 can be readily associated with and removed from the shaft 16 and can also be spaced any desired distance apart.

Figure 4:
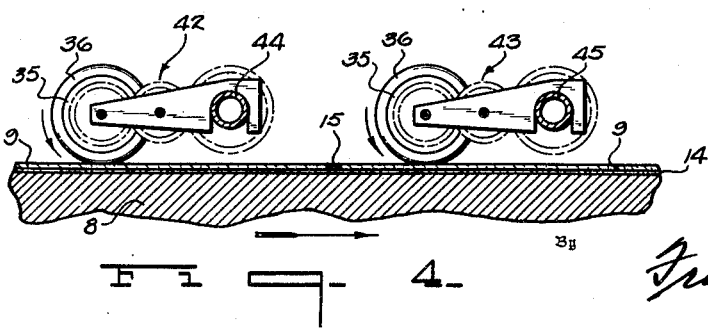
Fig. 4 is a vertical longitudinal sectional view showing a modified arrangement of the pressing units.

Instead of using a single set of pressure rollers 35 as described above, it may sometimes be desirable to utilize two sets of such rollers as illustrated in Fig. 4. The pressing apparatus here provided comprises the two series of pressing units 42 and 43 removably carried by the spaced transverse shafts 44 and 45 respectively. The pressing units 42 and 43 may be of the same construction as the pressing units 25 described above, although when using two series of pressing units, it is preferred that the units 43 be made relatively heavier than units 42 so that they will exert a somewhat greater pressure upon the glass sheets than the units 42. With such an arrangement, the pressing units 42 will have associated therewith an adjustable friction clutch, similar to clutch 23, whereas such a friction clutch need not be provided for the units 43. Further, the rollers 35 of pressing units 42 will be normally driven at a relatively faster speed than the movement of the tables 8 whereas the rollers 35 of pressing units 43 can be driven at a constant uniform speed equal to the travel of the tables.

In practice, the glass sheets 9 are first laid upon the layer of wet plaster 14 and carried first beneath the pressing units 42 and then beneath the pressing units 43. Since the rollers 35 of pressing units 42 normally rotate at a relatively greater speed than the speed of movement of the tables they will advance the sheet forwardly upon the layer of wet plaster until the forward edge thereof engages the spacer strip 15 and will hold the said sheet in this position until it passes beneath the pressing units 43, the rollers 35 of which will apply a greater pressure upon the sheet and thus act to force it downwardly into the plaster, with any excess plaster being squeezed from beneath the sheet at the side edges of the tables. In this case, the glass sheets are also evenly and uniformly pressed downwardly into the plaster as they are carried forwardly beneath the bedding apparatus so that when the plaster hardens, the said sheets will be rigidly secured to the said tables.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for mounting glass sheets which are to be surfaced, a table upon which the glass sheet is adapted to be mounted, a layer of plastic material on said table and upon which the glass sheet rests, means for moving said table in a horizontal path, a plurality of pressing units mounted in a fixed position above the path of travel of said table and including pressure rollers spaced transversely thereof for pressing the glass sheet downwardly into the plastic material as the said sheet is carried therebeneath, and means for positively driving said pressure rollers.

2. In apparatus for mounting glass sheets which are to be surfaced, a table upon which the glass sheet is adapted to be mounted, a layer of plastic material on said table and upon which the glass sheet rests, means for moving said table in a horizontal path, a plurality of pressing units mounted in a fixed position above the path of travel of said table and including pressure rollers spaced transversely thereof for pressing the glass sheet downwardly into the plastic material as the said sheet is carried therebeneath, means for positively driving said pressure rollers, and means operable so that said pressure rollers can rotate at a relatively slower speed than that at which they are normally positively driven.

3. In apparatus for mounting glass sheets which are to be surfaced, a table upon which the glass sheet is adapted to be mounted, a layer of plastic material on said table and upon which the glass sheet rests, means for moving said table in a horizontal path, a plurality of pressing units mounted in a fixed position above the path of travel of said table and including pressure rollers spaced transversely thereof for pressing the glass sheet downwardly into the plastic material as the said sheet is carried therebeneath, means for normally driving said pressure rollers at a relatively faster speed than the linear movement of said table to position the glass sheet thereon, and means operable so that the speed of rotation of said pressure rollers can be automatically reduced to correspond to the speed of travel of said table after the glass sheet has been properly positioned.

4. In apparatus for mounting glass sheets which are to be surfaced, a table upon which the glass sheet is adapted to be mounted, a layer of plastic material on said table and upon which the glass sheet rests, means for moving said table in a horizontal path, a plurality of pressing units mounted in a fixed position above the path of travel of said table and including pressure rollers spaced transversely thereof for pressing the glass sheet downwardly into the plastic material as the said sheet is carried therebeneath, means for positively driving said pressure rollers, and a friction clutch associated with said drive means operable so that said pressure rollers can rotate at a relatively slower speed than that at which they are normally driven by said drive means.

5. In apparatus for mounting glass sheets which are to be surfaced, a table upon which the glass sheet is adapted to be mounted, a layer of plastic material on said table and upon which the glass sheet rests, means for moving said table in a horizontal path, a horizontal shaft mounted transversely above the path of travel of said table, a plurality of pressing units removably associated with said shaft and including pressure rollers for pressing the glass sheet downwardly into the plastic material as the said sheet is carried therebeneath, means for positively driving said shaft, and means for transmitting the rotary movement of said shaft to said pressure rollers.

6. In apparatus for mounting glass sheets which are to be surfaced, a table upon which the glass sheet is adapted to be mounted, a layer of plastic material on said table and upon which the glass sheet rests, means for moving said table in a horizontal path, a horizontal shaft mounted transversely above the path of travel of said table, a plurality of pressing units removably associated with said shaft and including pressure rollers for pressing the glass sheet downwardly into the plastic material as the said sheet is carried therebeneath, means for positively driving said shaft, means for transmitting the rotary movement of said shaft to said pressure rollers, and means operable so that said pressure rollers can rotate at a relatively slower speed than that at which they are normally positively driven.

7. In apparatus for mounting glass sheets which are to be surfaced, a table upon which the glass sheet is adapted to be mounted, a layer of plastic material on said table and upon which the glass sheet rests, means for moving said table in a horizontal path, a horizontal shaft mounted transversely above the path of travel of said table, a plurality of pressing units removably associated with said shaft and including pressure rollers for pressing the glass sheet downwardly into the plastic material as the said sheet is carried therebeneath, means for positively driving said shaft, means for transmitting the rotary movement of said shaft to said pressure rollers, and a friction clutch associated with said shaft operable so that the said shaft and pressure rollers can rotate at a relatively slower speed than that at which they are normally positively driven.

8. In apparatus for mounting glass sheets which are to be surfaced, a table upon which the glass sheet is adapted to be mounted, a layer of plastic material on said table and upon which the glass sheet rests, means for moving said table in a horizontal path, a horizontal shaft mounted transversely above the path of travel of said table, a plurality of pressing units removably associated with said shaft and including pressure rollers for pressing the glass sheet downwardly into the plastic material as the said sheet is carried therebeneath, means for positively driving said shaft, means for transmitting the rotary movement of said shaft to said pressure rollers for normally driving said pressure rollers at a relatively faster speed than the linear movement of said table to position the glass sheet thereon, and means operable so that the speed of rotation of said pressure rollers can be automatically reduced to correspond to the speed of travel of said table after the glass sheet has been properly positioned.

9. In apparatus for mounting glass sheets which are to be surfaced, a table upon which the glass sheet is adapted to be mounted, a layer of plastic material on said table and upon which the glass sheet rests, means for moving said table in a horizontal path, two sets of pressing units mounted in fixed position above the path of travel of said table and horizontally spaced from one another, each set of pressing units including a plurality of pressure rollers spaced transversely of said table and adapted to press the glass sheet downwardly into the plastic material as the said sheet is carried successively beneath the two sets of pressing units, the second set of pressing units exerting a relatively greater pressure upon the glass sheet than the first set of pressing units, and means for positively driving all of said pressure rollers.

10. In apparatus for mounting glass sheets which are to be surfaced, a table upon which the glass sheet is adapted to be mounted, a layer of plastic material on said table and upon which the glass sheet rests, means for moving said table in a horizontal path, two sets of pressing units mounted in fixed position above the path of travel of said table and horizontally spaced from one another, each set of pressing units including a plurality of pressure rollers spaced transversely of said table and adapted to press the glass sheet downwardly into the plastic material as the said sheet is carried successively beneath the two sets of pressing units, the second set of pressing units exerting a relatively greater pressure upon the glass sheet than the first set of pressing units, means for positively driving all of said pressure rollers, with the pressure rollers of said second set of pressing units rotating at a speed corresponding to the speed of travel of the table, while the pressure rollers of said first set of pressing units are normally driven at a relatively faster speed than the linear movement of the table to position the glass sheet thereon, and means operable so that the speed of rotation of said last mentioned pressure rollers can be automatically reduced to correspond to the speed of travel of said table after the glass sheet has been properly positioned.

EDWIN A. ROSIN.